March 11, 1952  D. D. DEMAREST  2,588,809
KNIFE AND HOLDER MOUNTING THEREFOR
Filed Feb. 5, 1947
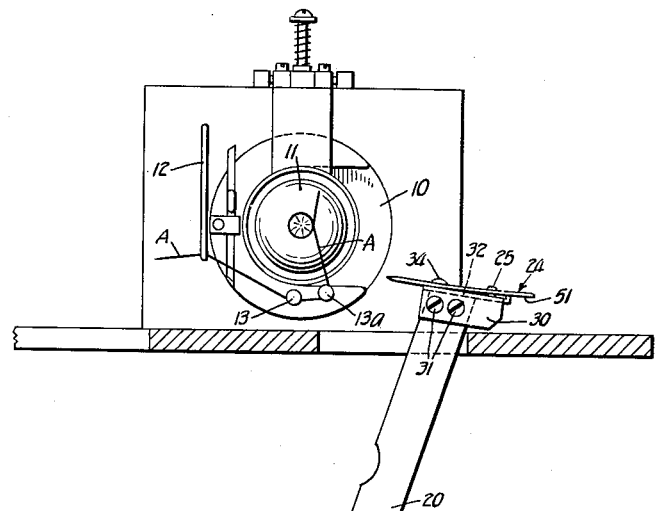
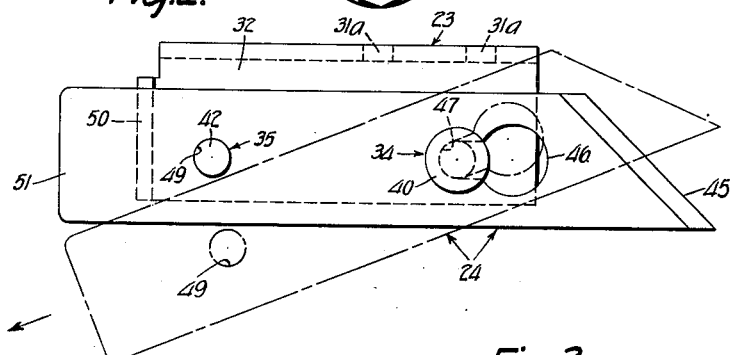
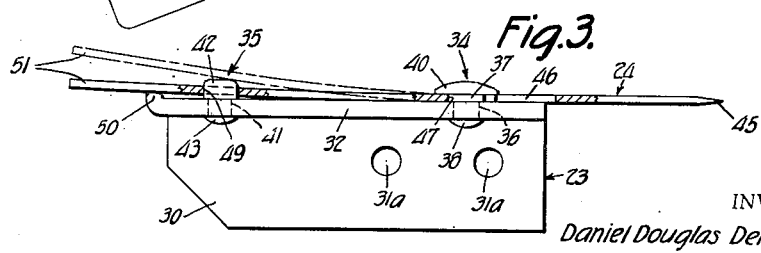
INVENTOR.
Daniel Douglas Demarest
BY Moses, Nolte, Crews & Berry
ATTORNEYS Patented Mar. 11, 1952

2,588,809

UNITED STATES PATENT OFFICE 2,588,809

KNIFE AND HOLDER MOUNTING THEREFOR

Daniel Douglas Demarest, Little Neck, N. Y., assignor to Linker Machines, Inc., Newark, N. J., a corporation of New Jersey Application February 5, 1947, Serial No. 726,524

14 Claims. (Cl. 164—41)

The present invention relates to a machine for winding a string around a stuffed sausage casing at spaced intervals, to form successive links, and more particularly to a device for severing the string at each of the winding stations.

In the Demarest et al. patents, Nos. 2,228,075 and 2,258,644, is disclosed a machine for linking a stuffed sausage casing by tightly winding a string around a casing at spaced intervals, to pinch the casing at such intervals, and thereby form the links. The string is severed after being wound around the casing by holding the string taut, and moving a knife against the tensioned string. The knife is attached to a bracket or holder at one end of an arm adapted to be angularly oscillated, to bring the knife into and out of cutting positions. Since this knife must be frequently replaced or sharpened, it is removably mounted on its holder.

In one common form of prior art construction, the knife is mounted on the holder through a pair of locating pins, and a spring clamp pin therebetween. The removal of this knife from its holder requires the use of a lifting tool on the spring clamp pin to release the spring tension on said knife, and thereby permit the knife to be lifted over and clear of the locating pins, and the cleared knife to be slipped sideways from under the clamp pin head. The insertion of the knife in position on the holder requires a similar manipulation involving the use of a lifting tool.

Among the objects of the present invention is to provide a new and improved knife and holder mounting therefor, which are comparatively simple and inexpensive to manufacture, which are effective to hold the knife firmly against play, and which permit the knife to be removed from the holder, or to be attached thereto by a comparatively simple manipulation requiring no tools.

Various other objects of the invention will be apparent from the following particular description, and from an inspection of the accompanying drawings, in which:

Fig. 1 is an end view somewhat diagrammatic and showing the sausage tying device provided with a knife and its mounting, embodying the present invention;

Fig. 2 is an enlarged top plan view of the knife and its mounting; and

Fig. 3 is a side elevation partly in section of the knife and its mounting.

The device of the present invention is applied to a sausage making machine of the general type shown and described in the Demarest et al. Patents Nos. 2,228,075 and 2,258,644. In such a machine, the sausage is fed into the field of action of two axially spaced tying mechanisms or stations by feed belts operating intermittently to feed predetermined lengths of sausage into said field of action. These feed belts are stationary while the tying mechanisms are operating, and the tying mechanisms work intermittently and are stationary while the feed belts are operating.

Each of the tying mechanisms wraps a string around the sausage casing, and the string is then severed. For accomplishing this operation, the tying mechanism comprises a tubular winder head 10, which is intermittently rotated in the manner as described in the Demarest et al. patents above referred to. Through this winder head 10 is intermittently fed the sausage 11 to be linked. The string A for linking the sausage passes from a cone (not shown) through water to wet the string, through a pull-back clamp (not shown), through a guide 12, and to springpressed gripper hook 13 and spring-pressed knife hook 13a mounted on the winder head 10. The knife hook 13a brings the string A forward to be cut by the knife, and provides sufficient length of string past the gripper hook 13 to relieve the tension during the tying operation without letting go of the end of the string. The gripper hook 13 holds the string firmly so that it can be carried around the sausage and can choke it to form the links.

The winder head 10 makes four revolutions and then stops, to permit the string to be cut and a fresh length of sausage to be fed into the machine. The first revolution brings in the required amount of string and loops it loosely around the sausage. The second revolution pulls this loop tightly by constricting the meat out of the sausage at that spot, and winds a second loop tightly around the first loop. The third revolution of the winder head 10 adds another loop of string around the sausage, and as the tension on the string is severe at this time, the gripper hook 13 opens partly and allows about one-half inch of the string to slip out. On the fourth revolution, both hooks 13 and 13a are completely opened to allow the end of the string to be released, and immediately thereafter, the hooks engage new string and bring it into position where it can be cut by the knife. Both ends of the string around the sausage are now free from the machine, while a new supply of string is being held by the hooks 13 and 13a.

The tying mechanism described is the specific one disclosed in the Demarest et al. patents above referred to, but it must be understood that since the invention is primarily in the string cutting device, as far as certain aspects of the invention are concerned, the sausage tying mechanism may be of any suitable type.

The string severing or cutting device comprises a knife arm 20 fixed at its lower end to a shaft 21 by a collar 22, and having a knife holder, bracket or support 23 at its upper end, on which is mounted a knife 24. The shaft 21 is rocked to oscillate the knife in and out of severing position by any suitable means, as for example, by an arm (not shown) affixed to the shaft 21, and having a roller engaging a cam, as disclosed in the Demarest et al. patents above referred to.

The knife holder 23 is in the form of an angle piece having a depending flange or web 30 secured to the knife arm 20 by means of screws 31 passing through holes 31a in the holder 23, and threaded into said arm. The holder 23 also has a top flat flange or web 32 serving as a seat for the knife 24. This top knife holder flange 32 has affixed thereto a pair of knife locating rivet pins 34 and 35 spaced therealong. The forward pin 34 has a shank 36 passing through the top knife holder flange 32, and provided with a shoulder 37 seated on the upper side of said flange, an end 38 upset against the lower side of said flange, and a round button or head 40 beyond said shoulder.

The other rearward knife locating pin 35 has a shank 41 passing through the top knife holder flange 32, a head 42 seated on the upper side of said flange, and an end 43 upset against the lower side of said flange.

The knife 24 is in the form of a wafer-thin blade, so that it has sufficient resiliency to flex, and has a bevelled cutting edge 45 at one end. This knife 24 has a hole with a circular part 46 through which the pin head 40 can pass, and a smaller circular offset 47 on one side of said circular part for snugly receiving the shoulder 37 of the pin 34. The knife 24 has a second hole 49 through which the pin head 42 extends with a snug fit when the pin shoulder 37 is in the hole offset 47 of the knife.

The snug fit connection between the knife 24 and the locating pins 34 and 35 is sufficient to mount said knife somewhat firmly on the holder 23. However, to assure firm mounting of the knife 24 in operative position, the rear end of the knife holder flange 32 has a ridge 50 on which the knife is seated, so that said knife is flexed upwardly near its rear end while its forward section is held downwardly against the flange 32 by the pin head 40. The blade 24 is therefore held rigidly in operative position against play.

To facilitate manipulation of the knife 24 for mounting or demounting, the rear end of said knife extends beyond the seating ridge 50 on the knife holder 23, to define a finger piece 51.

When it is desired to remove the knife 24 from its holder 23, the rear end 51 of the knife is raised until said knife clears the pin head 42, as shown in dot and dash lines in Fig. 3. The knife 24 is then swung angularly into the dot and dash line position shown in Fig. 2, until the knife clears the knife flexing ridge 50. The flexing finger pressure on the knife is released, and the knife while unflexed can be pulled rearwardly to bring the circular knife opening 46 in registry with the pin head 40. The knife 24 can then be raised clear of the pin head 46.

If desired, instead of swinging the knife 24 angularly to clear the knife flexing ridge 50 after clearing the pin head 42 as shown in Fig. 2, the knife can be pulled rearwardly while it is raised above the ridge and while it overlies said ridge, to bring the knife opening 46 in registry with the head 40. In this registered position, the knife 24 can be simply raised from the holder 23.

To mount the knife 24 in position, the reverse manipulation is required. For that purpose, the knife 24 is positioned angularly with respect to the holder 23 and clear of the ridge 50, and the knife slipped over the pin head 40 with said head passing through the knife opening 46. The knife 24 is then pushed forwardly so that the pin shoulder 37 slips into the offset knife opening 47. In this position, the rear end of the knife 24 is raised above the ridge 50, and the knife moved angularly until the knife hole 49 is in registry with the pin head 42. When the knife has been so located, it may be manually released, so that it will seat in flexed position on said ridge.

It is seen that the supporting means for the knife 24 is simple and inexpensive to manufacture, assures the rigid holding of the knife in operative position, and is such as to require no tools and no difficult manipulation to mount or demount the knife.

As many changes can be made in the above string cutting device, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A string cutting device for a sausage linking machine, comprising a knife holder, a first knife locating pin secured to said holder, a second knife locating pin secured to said holder and having a shank and a button head at one end of said shank, and a knife blade having a first hole receiving snugly said first pin, and a second hole with a part large enough to permit said button head to pass therethrough, and an offset part of smaller size receiving snugly said pin shank, the distance between said hole offset part and said first hole corresponding to the distance between said pins.

2. A string cutting device as described in claim 1, in which said knife blade is thin enough and resilient enough to flex, said string cutting device having means for flexing said knife blade in mounted position to hold said knife blade firmly against play during string severing action.

3. A string cutting device as described in claim 1, in which said knife blade is thin enough and resilient enough to flex, and in which said holder has a ridge on which the knife blade is seated, said ridge serving in conjunction with said second locating pin to flex said knife blade in mounted position, whereby said knife blade is held firmly against play during string severing action.

4. A string cutting device for a sausage linking machine comprising a knife holder defining a flat surface and a ridge extending from said surface, a first knife locating pin secured to said holder and projecting from said surface, a second knife locating pin secured to said holder and having a shank with a shoulder projecting from said surface and a button head at the outer end of said shoulder, and a knife blade having a first hole receiving snugly said first pin and a second hole with a part large enough to permit said button head to pass therethrough, and an offset part of smaller size receiving snugly said pin shoulder, the distance between said hole offset part and said first hole corresponding to the distance between said pins, said knife blade being thin enough and resilient enough to flex, and in mounted position resting against said ridge, whereby said knife blade is flexed and thereby retained firmly against play during string severing action.

5. A string cutting device as described in claim 4, in which said holder comprises an angle piece with one flange defining said flat surface and the ends of said knife blade project beyond opposite ends respectively of said flange, one projecting end of said blade having a string cutting edge, said ridge extending along one end of said flange nearest the other projecting end of said blade and crosswise of said blade.

6. A string cutting device as described in claim 5, comprising an angularly oscillatory arm secured to the other flange of said holder.

7. A string cutting device comprising a string severing knife blade having a cutting edge at one end, and means for mounting said knife blade in operative position, comprising a blade support with a seat for said blade, the section of said blade adjacent to said cutting edge overhanging said seat, means bearing against said blade on the side of said seat opposite said cutting edge and in a direction to hold said blade against movement transversely of its plane and away from said seat, and means bearing against said blade on the side of said first-mentioned bearing means opposite said cutting edge and in a substantially opposite direction to flex said blade about said first-mentioned bearing means and to press thereby said blade against said first-mentioned bearing means and against said seat, whereby said blade is firmly retained against play during blade severing action.

8. A string cutting device as described in claim 7, said blade having its section adjacent to its other end overhanging said second-mentioned bearing means and the corresponding end of said support for a substantial distance, to afford a finger piece by which said blade can be manipulated for mounting or demounting purposes.

9. A string cutting device as described in claim 7, said first-mentioned bearing means comprising a pin secured to said support, passing through a hole in said blade and having a head for holding said blade against movement away from said seat.

10. A string cutting device as described in claim 7, comprising a pair of pins on said support for locating said knife blade with respect to said support.

11. A string cutting device as described in claim 7, said first-mentioned bearing means comprising a headed blade engaging pin on said support passing through said blade, said string cutting device comprising a second pin on said support passing through said blade and cooperating with said headed pin to locate said blade with respect to said support.

12. A string cutting device as described in claim 7, said first-mentioned bearing means comprising a headed blade engaging pin on said support passing through said blade, said second-mentioned bearing means comprising a ridge on said support for raising said blade away from said support and thereby flex said blade about a section crosswise thereof.

13. A string cutting device for a sausage linking machine, comprising a knife blade support, a knife blade, and means for mounting said blade on to said support and for flexing it to hold it against play, said mounting means comprising a headed blade engaging pin on said support for holding said knife blade against movement away from said support, and a ridge on said support for raising the blade away from said support and thereby flex said blade about a section crosswise thereof, said blade in mounted position having its opposite ends projecting from the corresponding ends respectively of said support, one of said projecting ends defining a string cutting edge, while the other projecting end serves as a finger piece by which said blade can be manipulated for mounting or demounting purposes.

14. As an article of manufacture, a sausage string cutting knife blade for attachment to a knife holder having a blade supporting surface, a first locating pin of circular cross-section extending from said surface, a second blade locating pin extending from said surface and provided with a shank and a circular button head at one end of said shank, and a ridge portion raised above said surface for seating a part of said blade in mounted flexed position of said blade, said knife blade having a string cutting edge at one end and a pair of openings spaced along its length, one of said openings having a circular part for receiving said button head therethrough in the process of mounting said knife blade in position and a keying part offset from said circular part and large enough in width to receive said shank but small enough to prevent said button head to pass therethrough in mounted position of said knife blade, the other opening being entirely circular and free from offsets to receive said first locating pin, while said second locating pin is extending through said opening offset, said knife blade being thin enough to permit it to be flexed in mounted position with a part seated on said raised holder portion and to permit thereby said knife blade to be firmly supported against play.

DANIEL DOUGLAS DEMAREST.

REFERENCES CITED

The following references are of record in the file of this patent:

UNITED STATES PATENTS

| Number | Name | Date |
| --- | --- | --- |
| 118,075 | Vanstone | Aug. 15, 1871 |
| 299,083 | Murray | May 20, 1884 |
| 594,749 | Mitchell | Nov. 30, 1897 |
| 630,117 | Saur | Aug. 1, 1899 |
| 635,457 | Yandall | Oct. 24, 1899 |
| 670,389 | Hull | Mar. 19, 1901 |
| 678,002 | Miller | July 9, 1901 |
| 975,642 | Schaffelke | Nov. 15, 1910 |
| 1,558,021 | Libi | Oct. 20, 1925 |
| 2,382,210 | Cummine | Aug. 14, 1945 |

FOREIGN PATENTS

| Number | Country | Date |
| --- | --- | --- |
| 397,655 | Great Britain | Aug. 31, 1933 |